US012536954B2

(12) United States Patent
Sun et al.

(10) Patent No.: US 12,536,954 B2
(45) **Date of Patent: *Jan. 27, 2026**

(54) PIXEL CIRCUIT, DISPLAY PANEL AND CONTROL METHOD

(71) Applicant: WUHAN CHINA STAR OPTOELECTRONICS SEMICONDUCTOR DISPLAY TECHNOLOGY CO., LTD., Development Zone Wuhan-Hubei (CN)

(72) Inventors: Liang Sun, Development Zone Wuhan-Hubei (CN); Mian Zeng, Development Zone Wuhan-Hubei (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/922,514

(22) Filed: Oct. 22, 2024

(65) Prior Publication Data

US 2025/0046236 A1 Feb. 6, 2025

Related U.S. Application Data

(63) Continuation of application No. 17/419,747, filed as application No. PCT/CN2021/092685 on May 10, 2021, now Pat. No. 12,148,356.

(30) Foreign Application Priority Data

Apr. 16, 2021 (CN) ........................ 202110411773.9

(51) Int. Cl.
*G09G 3/32* (2016.01)
*G09G 3/3208* (2016.01)

(52) U.S. Cl.
CPC ............ *G09G 3/32* (2013.01); *G09G 3/3208* (2013.01); *G09G 2300/0842* (2013.01); *G09G 2320/0233* (2013.01); *G09G 2320/0247* (2013.01)

(58) Field of Classification Search
None
See application file for complete search history.

(56) References Cited

U.S. PATENT DOCUMENTS 10,049,613 B2 * 8/2018 Kimura ................ G09G 3/3225
11,373,590 B2 * 6/2022 Yuan .................... G09G 3/3233
(Continued)

FOREIGN PATENT DOCUMENTS

CN 108346399 A 7/2018
CN 109064973 A 12/2018
(Continued)

OTHER PUBLICATIONS

Chinese Office Action issued in corresponding Chinese Patent Application No. 202110411773.9 dated Jan. 20, 2022, pp. 1-9.
(Continued)

*Primary Examiner* — Fred Tzeng

(57) ABSTRACT

A pixel circuit, a display panel and a control method are disclosed. The pixel circuit includes a light-emitting device, a driving module, and a light-emitting control module. By inserting the corresponding number of black frame insertion pulses into the light-emitting control signal during the early light-emitting stage and the late light-emitting stage of one frame, the difference between the sum of the light-emitting currents in the early light-emitting stage of said frame and the sum of the light-emitting currents in the late light-emitting stage of said frame can be reduced, and the perceived brightness difference in one frame can be effectively reduced, so as to improve the screen flickers.

20 Claims, 7 Drawing Sheets

(56) References Cited

U.S. PATENT DOCUMENTS

| | | | | |
|---|---|---|---|---|
| 11,600,219 | B2 * | 3/2023 | Lai | G09G 3/32 |
| 11,663,962 | B2 * | 5/2023 | Yuan | G09G 3/3233<br>345/55 |
| 11,783,777 | B2 * | 10/2023 | Yang | G09G 3/3266<br>345/76 |
| 12,148,356 | B2 * | 11/2024 | Sun | G09G 3/32 |
| 12,217,659 | B2 * | 2/2025 | Lai | G09G 3/32 |
| 2018/0130424 | A1 * | 5/2018 | Gao | G09G 3/3233 |
| 2021/0335247 | A1 * | 10/2021 | Chen | G09G 3/3241 |

FOREIGN PATENT DOCUMENTS

| | | |
|---|---|---|
| CN | 110634439 | 12/2019 |
| CN | 111798801 A | 10/2020 |
| CN | 111833802 | 10/2020 |
| CN | 111968574 | 11/2020 |
| CN | 112259052 | 1/2021 |

OTHER PUBLICATIONS

Chinese Office Action issued in corresponding Chinese Patent Application No. 202110411773.9 dated Jul. 21, 2022, pp. 1-8.

Chinese Rejection Decision issued in corresponding Chinese Patent Application No. 202110411773.9 dated Jan. 6, 2023, pp. 1-6.

International Search Report in International application No. PCT/CN2021/092685,mailed on Jan. 19, 2022.

Written Opinion of the International Search Authority in International application No. PCT/CN2021/092685,mailed on Jan. 19, 2022.

* cited by examiner

PIXEL CIRCUIT, DISPLAY PANEL AND CONTROL METHOD

CROSS-REFERENCE TO RELATED APPLICATION

This application is a continuation application of U.S. application Ser. No. 17/419,747, filed on Jun. 30, 2021, which is a National Phase application of PCT Patent Application No. PCT/CN2021/092685, filed on May 10, 2021, which claims the priority of Chinese Patent Application No. 202110411773.9, filed on Apr. 16, 2021 and entitled “Pixel Circuit, Display Panel and Control Method”, the contents of which are incorporated herein by reference in their entireties.

TECHNICAL FIELD

The present disclosure relates to the field of display technology, and more particularly, to a pixel circuit, display panel and control method.

BACKGROUND

For self-luminous pixel circuits, such as 2T1C pixel circuits, 3T1C pixel circuits, 6T2C pixel circuits, or 7T1C pixel circuits, since a gate of a driving transistor has leakage currents, there are different light-emitting currents in light-emitting stages of a same frame, which show the brightness difference between the brightnesses of the same frame, and such brightness difference is the screen flickers which are perceivable by human eyes.

It should be noted that the above introduction of the background is only for convenience of clear and complete understanding of technical solutions of the present disclosure. Therefore, it cannot be considered that the aforementioned technical solutions are well known to those skilled in the art just because they appear in the background of the present disclosure.

SUMMARY

Technical Problem

A pixel circuit, a display panel, and a control method are provided to solve the technical problem of the screen flickers caused by large brightness difference of one frame in the pixel circuit.

In a first aspect, a pixel circuit is disclosed, which includes a light-emitting device, a driving module, and a light-emitting control module. The driving module is electrically connected to the light-emitting device for driving the light-emitting device to emit light. The light-emitting control module is connected to the driving module, wherein the light-emitting control module, the light-emitting device and the driving module are connected in series between a first voltage terminal and a second voltage terminal. A control terminal of the light-emitting control module is configured for receiving a light-emitting control signal, and the light-emitting control signal includes black frame insertion pulses and light-emitting pulses, the black frame insertion pulses are configured for cutting off an illumination loop of the pixel circuit, and the light-emitting pulses are configured for conducting the illumination loop. A light-emitting stage of a frame of the pixel circuit at least includes an early light-emitting stage of said frame and a late light-emitting stage of said frame, a duty ratio of the black frame insertion pulses to the early light-emitting stage of said frame is a first ratio value, a duty ratio of the black frame insertion pulses to the late light-emitting stage of said frame is a second ratio value, and the first ratio value is greater than the second ratio value.

In one of embodiments, in the early light-emitting stage of said frame, the black frame insertion pulses and the light-emitting pulses are alternate.

In one of embodiments, in the early light-emitting stage of said frame and/or the late light-emitting stage of said frame, at least one of widths of the black frame insertion pulses, a number of the black inserting pulses is different.

In one of embodiments, the number of the black frame insertion pulses within a unit time of at least portion of a time period in the early light-emitting stage of said frame is greater than the number of the black frame insertion pulses within a unit time of at least portion of a time period in the late light-emitting stage of said frame; and/or widths of at least portion of the black frame insertion pulses in the early light-emitting stage of said frame are greater than widths of at least portion of the black frame insertion pulses in the late light-emitting stage of said frame.

In one of embodiments, the duty ratio of the black frame insertion pulses within at least portion of a time period decreases in the order from a beginning to an end of the early light-emitting stage of said frame.

In one of embodiments, from the beginning to the end of the early light-emitting stage of said frame, the number of the black frame insertion pulses within the at least portion of the time period decreases, and/or widths of the black frame insertion pulses within the at least portion of the time period decrease.

In one of embodiments, a duty ratio of the early light-emitting stage of said frame to the light-emitting stage of said frame is greater than or equal to 25% and less than or equal to 75%.

In one of embodiments, the light-emitting stage of said frame further includes an intermediate light-emitting stage of said frame between the early light-emitting stage of said frame and the late light-emitting stage of said frame. A duty ratio of the black frame insertion pulses to the intermediate light-emitting stage of said frame is a third ratio value, the third ratio value is greater than or equal to the second ratio value, and the third ratio value is less than the first ratio value.

In one of embodiments, the driving module includes a driving transistor, and the light-emitting control module includes a first light-emitting control transistor and a second light-emitting control transistor. One of a source and a drain of the first light-emitting control transistor is connected to the first voltage terminal. The other of the source and the drain of the first light-emitting control transistor is connected to one of a source and a drain of the driving transistor. The other of the source and the drain of the driving transistor is connected to one of a source and a drain of the second light-emitting control transistor. The other of the source and the drain of the second light-emitting control transistor is connected to an anode of the light-emitting device. A cathode of the light-emitting device is connected to the second voltage terminal. A gate of the first light-emitting control transistor and a gate of the second light-emitting control transistor both are configured for receiving the light-emitting control signal.

In one of embodiments, the pixel circuit further includes a transmission transistor, a first reset transistor, a second reset transistor, and a storage capacitor. One of a source and a drain of the transmission transistor is connected to the other of the source and the drain of the driving transistor.

The other of the source and the drain of the transmission transistor is connected to a gate of the driving transistor, one terminal of the storage capacitor and one of a source and a drain of the first reset transistor. The other terminal of the storage capacitor is connected to the first voltage terminal. The other of the source and the drain of the first reset transistor is connected to one of a source and a drain of the second reset transistor and is configured for receiving a reset signal. The other of the source and the drain of the second reset transistor is connected to the anode of the light-emitting device; each of the transmission transistor and the first reset transistor is a low-temperature polysilicon thin film transistor.

In a second aspect, a display panel is disclosed, which includes a light-emitting driving circuit and the pixel circuit of any one of the aforementioned embodiments. The light-emitting driving circuit is connected to the pixel circuit to provide the light-emitting control signal.

In a third aspect, a method for controlling the aforementioned display panel, which includes: controlling the light-emitting driving circuit to provide the light-emitting control signal to the pixel circuit during the light-emitting stage of the frame of the pixel circuit.

Beneficial Effect

For the pixel circuit, the display panel and the control method disclosed in the present disclosure, by inserting the corresponding number of the black frame insertion pulses into the light-emitting control signal during the early light-emitting stage and the late light-emitting stage of one frame, the difference between the sum of the light-emitting currents in the early light-emitting stage of said frame and the sum of the light-emitting currents in the late light-emitting stage of said frame can be reduced, and the perceived brightness difference in one frame can be effectively reduced, so as to improve the screen flickers.

DETAILED DESCRIPTION

In order to make the purpose, technical solution and effect of the present disclosure clearer and more definite, the present disclosure is further described in detail with reference to the attached drawings and embodiments. It should be understood that the specific embodiments described herein are only used to explain the present disclosure and the present disclosure is not limited thereto.

Figure 1:
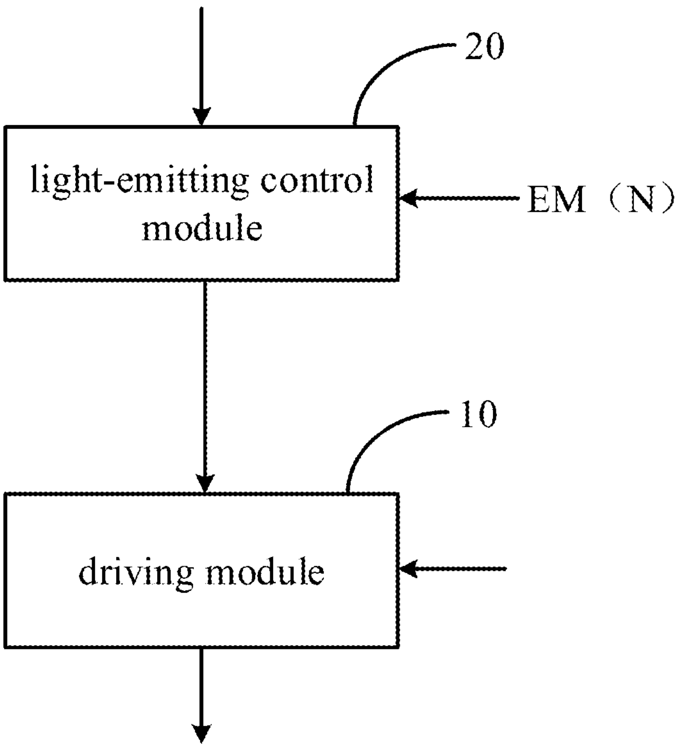
FIG. 1 is a structural diagram of a pixel circuit provided by embodiments of the present disclosure.
Figure 2:
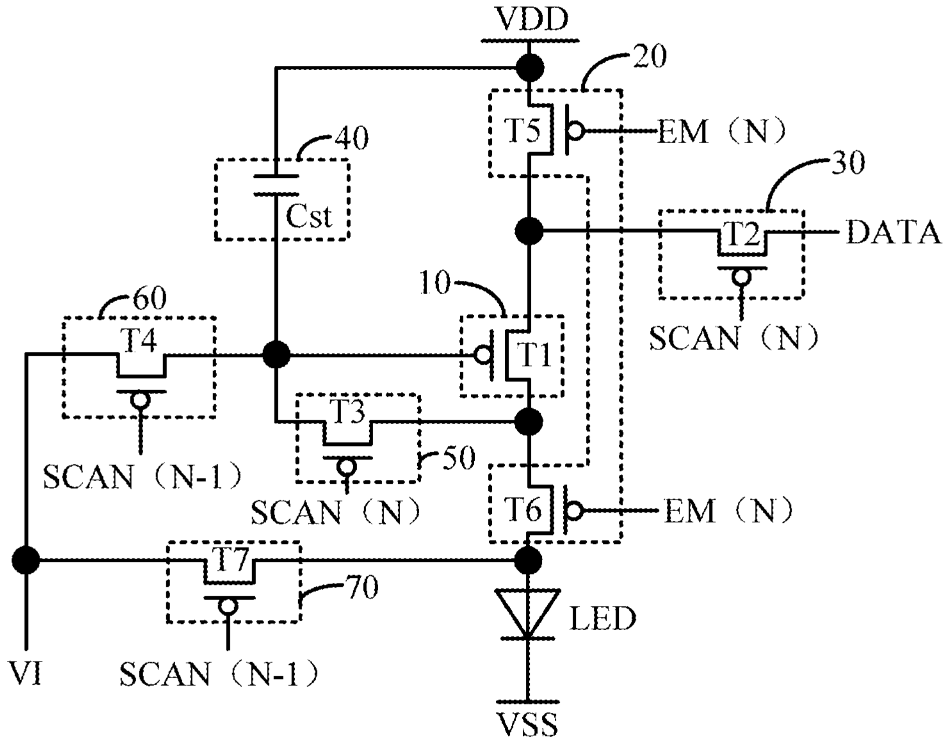
FIG. 2 is another structural diagram of a pixel circuit provided by embodiments of the present disclosure.

References are made to FIG. 1 to FIG. 10. As shown in FIG. 1 and FIG. 2, the present embodiment provides a pixel circuit including a driving module 10 and a light-emitting control module 20. The light-emitting control module 20 is connected to the driving module 10, and a control terminal of the light-emitting control module 20 is configured for receiving a light-emitting control signal EM (N), and the light-emitting control signal EM (N) includes black frame insertion pulses. The light-emitting stage of one frame of the pixel circuit at least includes an early light-emitting stage of said frame and a late light-emitting stage of said frame. A duty ratio of the black frame insertion pulses to the early light-emitting stage of said frame is a first ratio value, a duty ratio of the black frame insertion pulses to the late light-emitting stage of said frame is a second ratio value, and the first ratio value is greater than the second ratio value.

It should be noted that the light-emitting control signal EM (N) includes the black frame insertion pulses and the light-emitting pulses. The black frame insertion pulses are configured for cutting off the illumination loop of the pixel circuit, and the light-emitting pulses are configured for conducting the illumination loop. In the light-emitting stage of the frame, the black frame insertion pulses and the light-emitting pulses are alternate. It can be understood that the black frame insertion pulses can be used to reduce the sum of the light-emitting current in the light-emitting stage of the frame. Specifically, the black frame insertion pulses can control the light-emitting control module 20 in the off-state, so as to cut off the illumination loop, thereby reducing the light-emitting current flowing through the illumination loop.

It can be understood that the pixel circuit provided by the present embodiment can reduce the difference between the sum of the light-emitting currents in the early light-emitting stage of the frame and the sum of the light-emitting currents in the late light-emitting stage of the frame by inserting the corresponding number of the black frame insertion pulses into the light-emitting control signal EM (N) during the early light-emitting stage of the frame and the late light-emitting stage of the frame, and the perceived brightness difference in one frame can be effectively reduced, so as to improve the screen flickers.

The second ratio value is greater than or equal to zero. When the second ratio value is equal to zero, it is characterized by that there is no black frame insertion pulse in the late light-emitting stage of the frame. That is, the original brightness can be maintained during the late light-emitting stage of the frame.

The driving module 10 may include a driving transistor T1. The light-emitting control module 20 may include a first light-emitting control transistor T5. One of the source/drain of the first light-emitting control transistor T5 is connected to the source/drain of the driving transistor T1. The gate of the first light-emitting control transistor T5 is configured for receiving the light-emitting control signal EM (N). The other of the source/drain of the first light-emitting control transistor T5 is configured for receiving a first voltage signal VDD, wherein the first voltage signal VDD is derived from a first voltage terminal.

In some of embodiments, the light-emitting control module 20 may further include a second light-emitting control transistor T6. One of the source/drain of the second light-emitting control transistor T6 is connected to the other of the source/drain of the driving transistor T1. The gate of the second light-emitting control transistor T6 is configured for receiving the light-emitting control signal EM (N).

In some of embodiments, the pixel circuit may further include a light-emitting device LED. The anode of the light-emitting device LED is connected to the other of the source/drain of the second light-emitting control transistor T6. The cathode of the light-emitting device LED is configured for receiving a second voltage signal VSS. The second voltage signal VSS is derived from the second voltage terminal.

The potential of the first voltage signal VDD is higher than the potential of the second voltage signal VSS. The light-emitting device LED may be, but not limited to, an organic light-emitting diode (OLED), mini-LED, or micro-LED.

In some of embodiments, the pixel circuit may further include a writing module 30. The writing module 30 is connected to the driving module 10.

In some of embodiments, the writing module 30 includes a writing transistor T2. One of the source/drain of the writing transistor T2 is configured for receiving data signal DATA. The other of the source/drain of the writing transistor T2 is connected to one of the source/drain of the driving transistor T1. The gate of the writing transistor T2 is configured for receiving a first control signal. The first control signal may be, but not limited to, a $N_{th}$-stage scan signal SCAN (N).

In some of embodiments, one of the source/drain of the writing transistor T2 is configured for receiving the data signal DATA. The other of the source/drain of the writing transistor T2 is connected to the gate of the driving transistor T1.

It should be explained that the absolute value of the charging voltage of the data signal DATA is equal to the absolute value of the initial charging potential of the data signal DATA and the absolute value of the incremental charging potential of the data signal DATA. In other words, the overall brightness of the light-emitting stage within a frame can be improved by enhancing the charging ability of the data signal DATA, which can compensate the brightness drop caused by the insertion of the black frame insertion pulses during the light-emitting stage of the frame in some embodiments in order to reduce the flickers.

In some of embodiments, the pixel circuit may include a storage module 40. One terminal of the storage module 40 is connected to the control terminal of the driving module 10. The other terminal of the storage module 40 is configured for connecting the first voltage signal VDD.

The storage module 40 may include a storage capacitor Cst. A first terminal of the storage capacitor Cst is connected to the gate of the driving transistor T1. A second terminal of the storage capacitor Cst is connected to the first voltage signal VDD.

In some of embodiments, the pixel circuit may further include a transmission module 50. The transmission module 50 is connected to the driving module 10.

The transmission module 50 may include a transmission transistor T3. One of the source/drain of the transmission transistor T3 is connected to the other of the source/drain of the driving transistor T1. The other of the source/drain of the transmission transistor T3 is connected to the gate of the driving transistor T1. The gate of the transmission transistor T3 is configured for receiving the first control signal. The transmission transistor T3 can be configured to transmit the data signal DATA when being conducted. The transmission transistor T3 can be configured to the leakage current of the driving transistor T1 when being cut-off.

In some of embodiments, the pixel circuit may further include a first reset module 60. The first reset module 60 is connected to one terminal of the storage module 40.

The first reset module 60 may include a first reset transistor T4. One of the source/drain of the first reset transistor T4 is configured for receiving a reset signal VI. The other of the source/drain of the first reset transistor T4 is connected to the gate of the driving transistor T1. The gate of the first reset transistor T4 is configured for receiving the second control signal. The second control signal may be, but not limited to, an $(N-1)_{th}$-stage scan signal SCAN (N−1).

In some of embodiments, the pixel circuit may further include a second reset module 70. The second reset module 70 is connected to the anode of the light-emitting device LED.

The second reset module 70 may include a second reset transistor T7. One of the source/drain of the second reset transistor T7 is configured for receiving the reset signal VI. The other of the source/drain of the second reset transistor T7 is connected to the anode of the light-emitting device LED. The gate of the second reset transistor T7 is configured for receiving the first control signal.

In some of embodiments, the number of the black frame insertion pulses within a unit time of at least portion of a time period in the early light-emitting stage of the frame is greater than the number of the black frame insertion pulses within a unit time of at least portion of a time period in the late light-emitting stage of the frame; and/or widths of at least portion of the black frame insertion pulses in the early light-emitting stage of the frame are greater than widths of at least portion of the black frame insertion pulses in the late light-emitting stage of the frame.

In some of embodiments, the duty ratio of the black frame insertion pulses within at least portion of a time period decreases in the order from a beginning to an end of the early light-emitting stage of the frame. For example, the duty ratio of the black frame insertion pulses within an initial time of the early light-emitting stage of the frame may greater than the duty ratio of the black frame insertion pulses within other time of the early light-emitting stage of the frame, so that the brightness in the initial time of the light-emitting stage of the frame can be lowered quickly to improve the uneven brightness caused by excessive brightness variation in the initial time of the light-emitting stage of the frame.

In some of embodiments, from the beginning to the end of the early light-emitting stage of the frame, the number of the black frame insertion pulses within the at least portion of the time period decreases, and/or widths of the black frame insertion pulses within the at least portion of the time period decrease.

In some of embodiments, the duty ratio of the early light-emitting stage of the frame to the light-emitting stage of the frame is greater than or equal to 25% and less than or equal to 75%.

In some of embodiments, the light-emitting stage of the frame further includes an intermediate light-emitting stage of the frame. The intermediate light-emitting stage of the frame is between the early light-emitting stage of the frame and the late light-emitting stage of the frame. The duty ratio of the black frame insertion pulses to the intermediate light-emitting stage of the frame is a third ratio value, the third ratio value is greater than or equal to the second ratio value, and the third ratio value is less than the first ratio value.

It is necessary to explain that in the present embodiment, the light-emitting stage of the frame is divided into multiple different intervals and the black frame insertion pulses with different duty ratios are used correspondingly for adjustment, such that the brightness difference of each interval may be further lowered to further reduce the brightness difference within one frame.

In some of embodiments, the time ratio of the early light-emitting stage of the frame to the light-emitting stage of the frame is one-third, and the time ratio of the late light-emitting stage of the frame to the light-emitting stage of the frame is one-third.

In some of the embodiments, the pixel circuit further includes the writing module 30. The writing module 30 is connected to the driving module 10, and the writing module 30 is configured for receiving the data signal DATA. The absolute value of the charging voltage of the data signal DATA is equal to the absolute value of the initial charging potential of the data signal DATA and the absolute value of the incremental charging potential of the data signal DATA.

It is should be noted that the data signal DATA with higher charging potential in the present embodiment can further improve the luminous intensity of the pixel circuit as a whole.

It is necessary to explain that any of the aforementioned transistors may be, but not limited to, polysilicon thin film transistor, and may be low-temperature polysilicon thin film transistor. It can be understood that in this case, the response speed of the pixel circuit is faster and has higher dynamic performance.

In some of embodiments, these low-temperature polysilicon thin film transistors may be, but not be limited to, p-channel thin film transistors, or N-channel thin film transistors. The types and manufacturing processes of the thin film transistors in the pixel circuit are consistent, which can simplify the structure and manufacturing process of the thin film transistors.

In some of embodiments, at least one of the transmission transistors T3 and the first reset transistor T4 may also be oxide transistor. It can be understood that the leakage current of the pixel circuit may be further reduced in this way.

It can be understood that the pixel circuit may be applied to the active-matrix organic light-emitting diode (AMOLED) panel of the mobile phone, and the aforementioned pixel circuits may also use low-temperature polysilicon (LTPS) thin film transistors (TFTs) as backplane drive.

Figure 3:
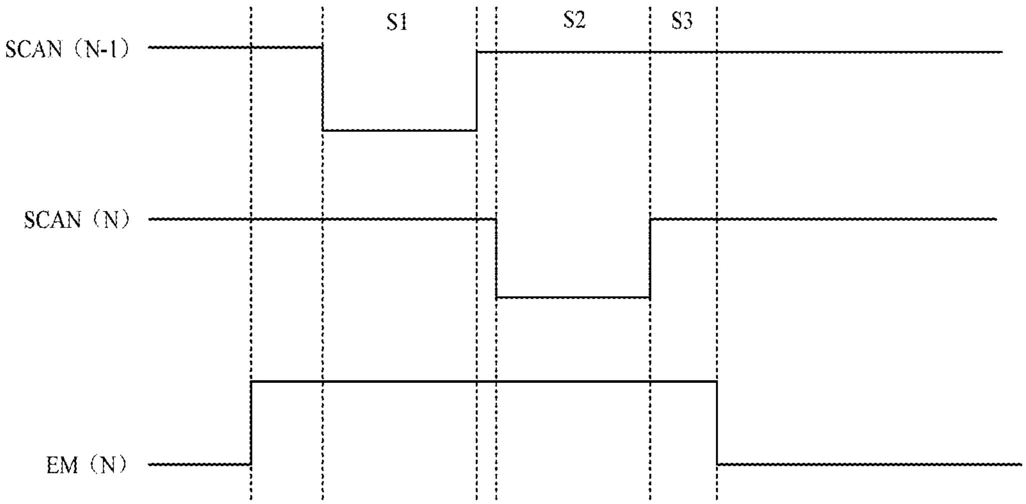
FIG. 3 is a timing diagram corresponding to the pixel circuit in FIG. 2.

As shown in FIG. 3, when the architecture of the pixel circuit in the aforementioned embodiment is 7T1C, the operation process can be divided into three main operation stages:

First stage S1: the scan signal SCAN (N−1) of the $(N-1)_{th}$-stage is set to be at a low potential, the first reset transistor T4 and the second reset transistor T7 are turned on, and the potentials of the gate of the driving transistor T1 and the anode of the light-emitting device LED are reset to the potential of the reset signal VI.

Second stage S2: the scan signal SCAN (N) of the $N_{th}$-stage is set to be at a low potential, the writing transistor T2 and the transmission transistor T3 are turned on, and the potential of the gate of the driving transistor T1 is at Vdata-Vth, in which Vth is a threshold voltage of the driving transistor T1 and Vdata is the potential of the data signal DATA.

Third stage S3: the light-emitting control signal EM (N) is set to be at a low potential, and the light-emitting device LED starts to emit light.

During the second stage S2, the writing transistor T2, the driving transistor T1 and the transmission transistor T3 are turned on, and the first reset transistor T4, the first light-emitting control transistor T5 and the second light-emitting control transistor T6 are turned off. At this time, the data signal DATA charges the gate of the driving transistor T1 through the charging path formed by the writing transistor T2, the driving transistor T1 and the transmission transistor T3. When the potential of that gate of the driving transistor T1 rises to Vdata-Vth, the driving transistor T1 is cut off, and the gate potential thereof no longer rises.

Figure 4:
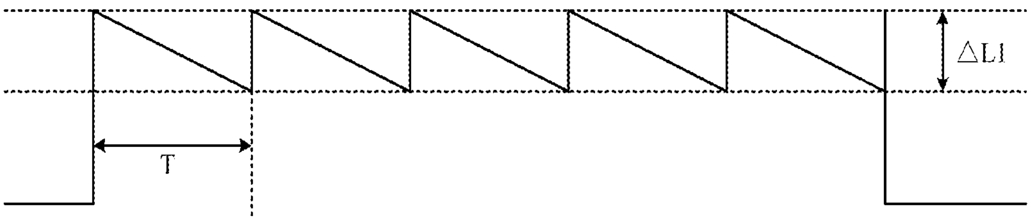
FIG. 4 is a first schematic diagram of a brightness difference in the light-emitting stage of the frame provided by embodiments of the present disclosure.

During the third stage S3, the brightness of the pixel is directly determined by the gate potential of the driving transistor T1. In the light-emitting stage, the main factor of affecting the gate potential is the leakage current of the TFT. Since the gate is connected with two TFTs (the transmission transistor T3 and the first reset transistor T3), the leakage current characteristics of the two TFTs may directly affect the brightness stability in the light-emitting stage. When the transmission transistor T3 and the first reset transistor T4 use LPTS TFTs, the leakage currents thereof are large, and the brightness of the picture in one frame may decrease with time. As shown in FIG. 4, under the condition of low-frequency driving, which may be, but not limited to, less than 30 Hz, or may further be less than 10 Hz, the light-emitting time of the frame Tis long. The longer the light-emitting time of the frame T is, the more serious the leakage current of the gate of the driving transistor T1 is. Therefore, a larger brightness variation $\Delta L1$ occurs in one frame, and thus producing larger flickers that can be perceived by human eyes.

In another embodiment, at least one of the transmission transistor T3 and the first reset transistor T4 can be replaced by indium gallium zinc oxide (IGZO) TFT with low leakage current, which can reduce the leakage current and improve the problem that the flickers are serious under the low-frequency driving, such that the AMOLED panel may adopt the low-frequency driving scheme while displaying static pictures to achieve the purpose of reducing power consumption. However, the backplane drive which combines LTPS TFT and IGZO TFT has more complex structure and process, and higher cost.

In view of this, in the present disclosure, the light control signals with different pulse widths can be modulated to improve the brightness difference in one frame on the basis of any of the aforementioned embodiments. Moreover, different black frame insertion pulses are inserted during the light-emitting stage to further reduce the power consumption of the pixel circuit. For example, when the potential is low, the light-emitting pulse with about-10V is required to turn on the first light-emitting control transistor T5 and/or the second light-emitting control transistor T6, and the black frame insertion pulse with only about 0V is able to turn off the first light-emitting control transistor T5 and/or the second light-emitting control transistor T6. For another example, when the potential is high, the light-emitting pulse with any voltage between 10V to 20V is required to turn on the first light-emitting control transistor T5 and/or the second light-emitting control transistor T6, and the black frame insertion pulse with only about 0V is able to turn off the first light-emitting control transistor T5 and/or the second light-emitting control transistor T6.

The luminous brightness of a single pixel is the product of the current flowing through this LED and the luminous efficiency thereof. When the luminous efficiency is fixed, the luminous brightness at a certain time is proportional to the current, which can be expressed as F (I-LED). In one frame time, the total luminous brightness is the integral of F (I-LED) in this frame time.

The simplified method of simulation and evaluation of Flickr is to evaluate the maximum average current difference at the beginning and end of one frame. Taking the driving frequency of 60 Hz as an example, one frame time is 16.67 ms, the average current value at 0.95-1 ms (It=1 ms) and the average current value (It=1 ms) at 16.45 ms-16.5 ms are calculated, and Flickers can be calculated by the following formula:

$$\text{Flicker} = \frac{I_t = 1\text{ ms} - I_t = 16.5\text{ ms}}{(I_t = 1\text{ ms} + 16.5\text{ ms})/2} \times 100\%$$

Figure 5:
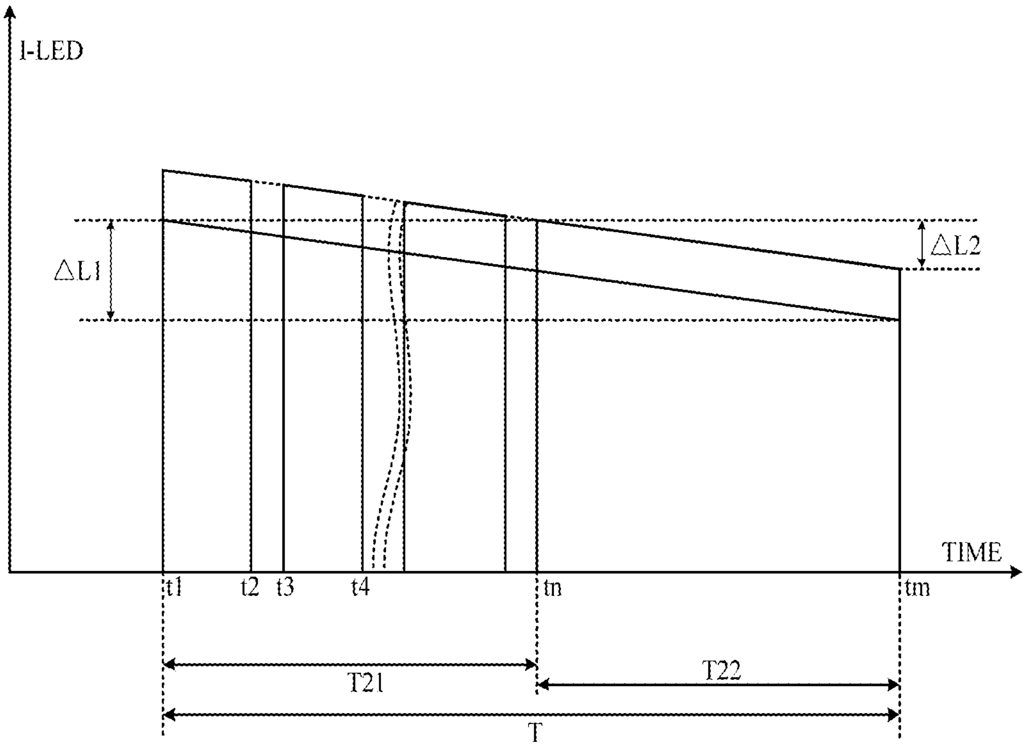
FIG. 5 is a second schematic diagram of a brightness difference in the light-emitting stage of the frame provided by embodiments of the present disclosure.
Figure 6:
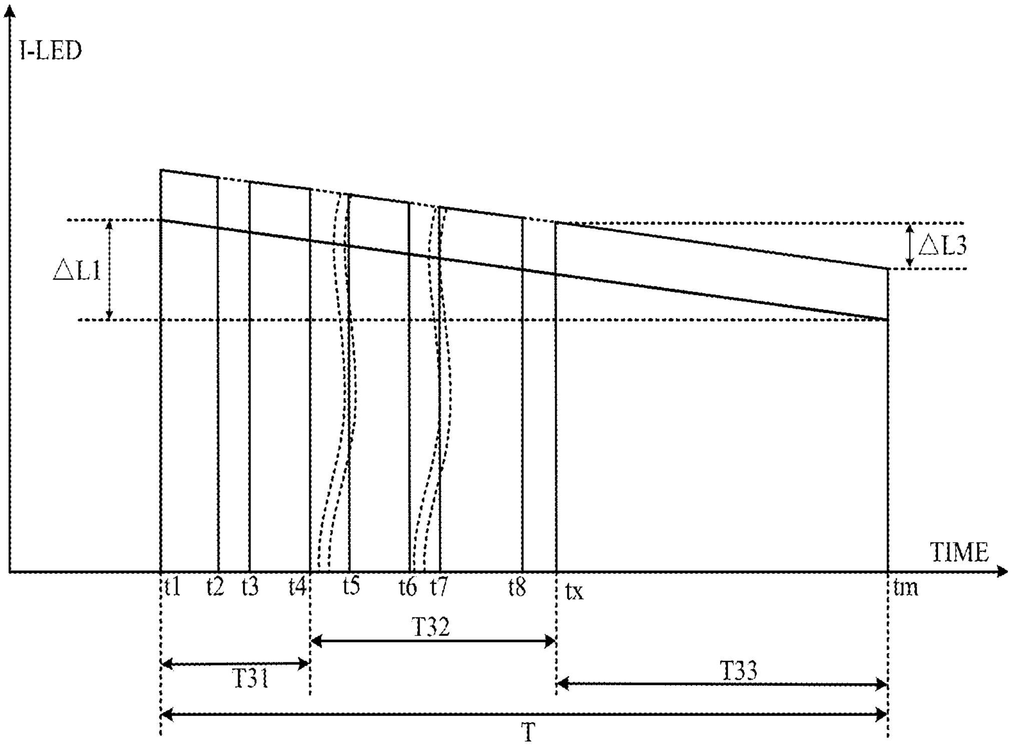
FIG. 6 is a third schematic diagram of a brightness difference in the light-emitting stage of the frame provided by embodiments of the present disclosure.

As shown in FIG. 5 or FIG. 6, specifically, in one frame time, the brightness perceived by the human eyes is the integral of the function of the current with respect to the luminous efficiency over time, which can be expressed as follows:

$$\int_{tm}^{t1} F(I - LED)dt$$

The brightness variation within one frame time which can be perceived by the human eyes represents the screen flicker. One frame time is long under the low-frequency driving, and the leakage current is caused by the transistor connected to the gate of the driving transistor T1, which results in a large change in the gate voltage of the driving transistor T1 to lead to a large change in the current flowing through the light-emitting device LED. As a result, the difference in brightness between the beginning stage and the end stage of one frame time is large, and the large flicker is shown synchronously.

Based on the above analysis, in one of the embodiments, as shown in FIG. 5, the light-emitting time within one frame, i.e. the light-emitting stage of the frame T, can be divided into two portions. The first portion T21 may occupy about ¼-¾ of the light-emitting time within one frame, in which the light-emitting time in which the light-emitting pulses are may be t1-t2 and/or t3-t4, and the time in which the black frame insertion pulse may be t2-t3. The second portion T22 may occupy about ¾-¼ of the light-emitting time within one frame, i.e., the time period tn-tm. In the first portion of the frame time, pulse width modulation (PWM) is carried out for the light-emitting control signal EM (N). That is, the pulse width modulation of the light-emitting pulses and/or the black frame insertion pulse of the light-emitting control signal EM (N). In this way, the brightness of the first portion can be reduced, so that the brightness difference ΔL2 of any portion of the two portions can be further decreased until the brightness difference between the two portions decreases to the minimum or zero, in which ΔL1 is the brightness difference of the light-emitting stage of the frame T, and ΔL1 is greater than ΔL2. I-LED is the light-emitting current flowing through the LED. As a result, the whole brightness may be lowered. In order to maintain the original brightness, the adjusted brightness can be recovered to the required brightness or the original brightness by adjusting the charging potential or gamma voltage of the data signal DATA under the low-frequency driving. The principle of pulse width modulation can be expressed as follows:

$$\int_{t1}^{t2} F(I - LED)dt + \int_{t3}^{t4} F(I - LED)dt + \ldots = \int_{tn}^{tm} F(I - LED)dt$$

That is, by performing PWM on the first portion of the frame to make the brightness of the first portion to be equivalent to the brightness of the second portion, the brightness variation perceived by the human eyes in one frame may be reduced, so as to reduce the flickers under the low-frequency driving. For the black frame insertion pulses of the light-emitting control signal in the first portion of the frame, the total black frame insertion time can be adjusted by adjusting at least one of the widths of the black frame insertion pulses, the number of the black inserting pulses and the black frame insertion pulses with different pulse widths, so as to reduce the sum of the brightness of the first portion. The widths of the black frame insertion pulses may also be gradually changed.

As shown in FIG. 6, in one of the embodiments, the light-emitting time within one frame, i.e. the light-emitting stage of the frame T, can be divided into three portions. In the front ⅓ light-emitting stage of the frame T31 and the intermediate ⅓ frame light-emitting stage of the frame T32, PWM having different duty cycles is performed on the light-emitting control signal. In the last ⅓ light-emitting stage of the frame T33, it may be allowed to not perform PWM on the light emitting control signal. It can be understood that the time periods t1-t2, t3-t4, t5-t6, and t7-t8 may all be the time domain occupied by the light-emitting pulses, and the time periods t2-t3, t4-t5, and t6-t7 may all be the time domain occupied by the black frame insertion pulses. After modulation, the brightness difference of the light-emitting stage of each ⅓ frame is ΔL3. Compared with the brightness difference ΔL1 of the light-emitting stage of the frame T before modulation, it is obvious that ΔL3 is less than ΔL2, and ΔL2 is less than ΔL1. In this way, the brightness difference of different light-emitting stages of the frame can be further reduced. In the same way, this may cause the overall brightness of the light-emitting stage of the frame to decrease. In order to maintain the original brightness, the adjusted brightness can be recovered to the required brightness or the original brightness by adjusting the charging potential or gamma voltage of the data signal DATA under the low-frequency driving. The principle of pulse width modulation can be expressed as follows:

$$\int_{t1}^{t2} F(I - LED)dt + \int_{t3}^{t4} F(I - LED)dt + \ldots = \int_{t5}^{t6} F(I - LED)dt + \int_{t7}^{t8} F(I - LED)dt + \ldots = \int_{tn}^{tm} F(I - LED)dt$$

That is, by performing PWM on the front ⅓ light-emitting stage of the frame and the intermediate ⅓ light-emitting stage of the frame to make the brightnesses of the front ⅓ light-emitting stage of the frame, the intermediate ⅓ light-emitting stage of the frame, and the last ⅓ light-emitting stage of the frame are the same, the brightness difference ΔL3 of each ⅓ light-emitting stage of the frame may be further reduced, so as to further decrease the brightness variation in one frame perceived by the human eyes, thereby greatly reducing the flickers under the low-frequency driving.

In the same way, the light-emitting time in one frame can be divided into more portions, so as to reduce the brightness variation in one frame perceived by the human eyes more greatly and decrease the flickers under the low-frequency driving more greatly, thereby achieving the driving scheme with lower frequency.

In one of the embodiments, a display panel is disclosed, which includes a light-emitting driving circuit and a pixel circuit in any one of the aforementioned embodiments. The light-emitting driving circuit is connected to the pixel circuit to provide the light-emitting control signal.

It can be understood that the pixel circuit provided by the present embodiment can reduce the difference between the sum of the light-emitting currents in the early light-emitting stage of the frame and the sum of the light-emitting currents in the late light-emitting stage of the frame by inserting the corresponding number of the black frame insertion pulses into the light-emitting control signal during the early light-emitting stage of the frame and the late light-emitting stage of the frame, so that the perceived brightness difference within one frame can be effectively reduced, thereby improving the screen flickers.

The light-emitting driving circuit may be an emitting on array (EOA) circuit, which may be disposed on the array substrate to output the corresponding light-emitting control signal.

Figure 7:
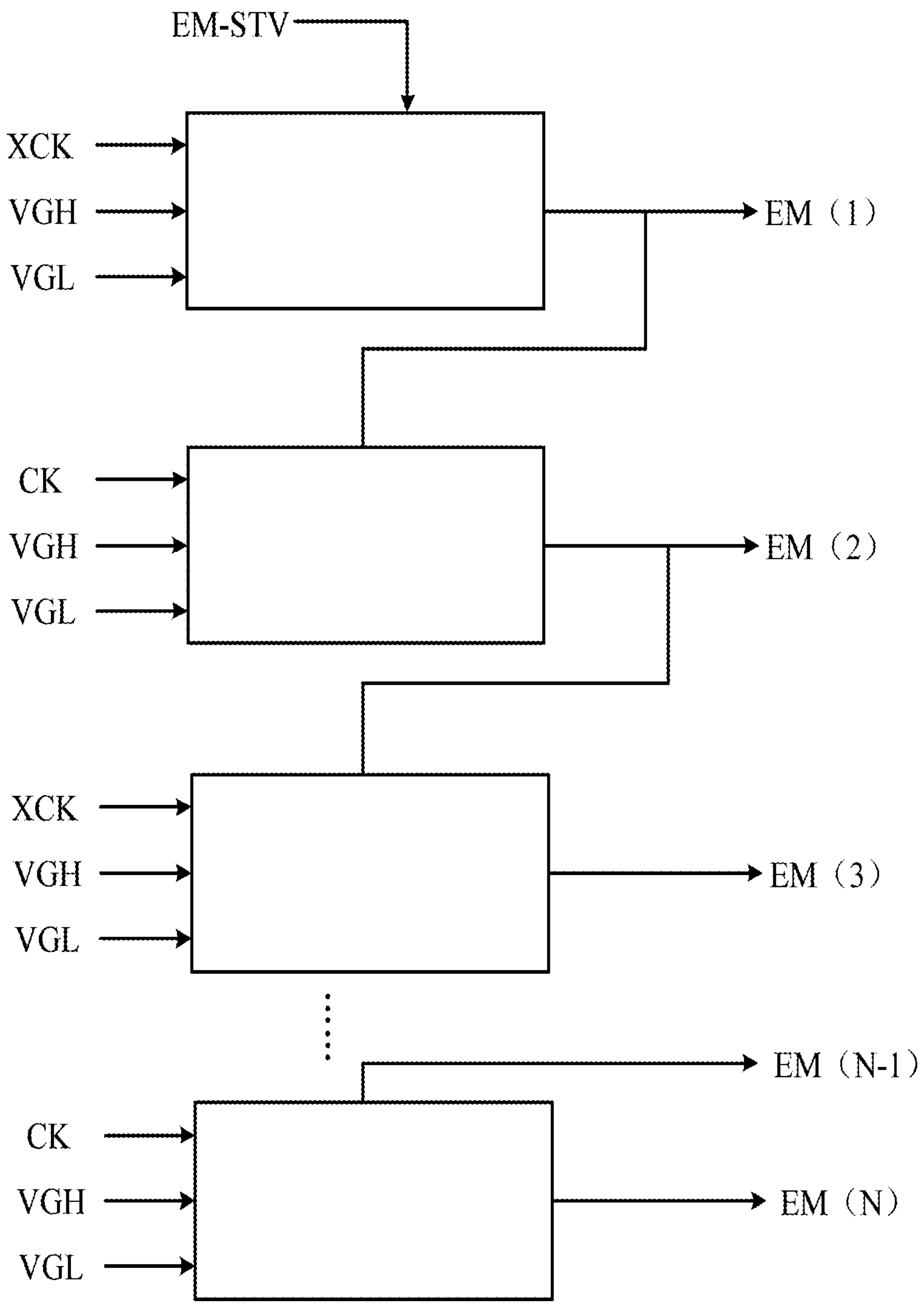
FIG. 7 is a structural diagram of a light-emitting driving circuit provided by embodiments of the present disclosure.

As shown in FIG. 7, the light-emitting driving circuit may include multiple cascaded EOA units. For example, the first stage light-emitting control signal EM (1) outputted by the first stage EOA unit can be used as the input signal of the second stage EOA unit. The second stage light-emitting control signal EM (2) outputted by the second stage EOA unit can be used as the input signal of the third stage EOA unit. The third stage light-emitting control signal EM (3) outputted by the third stage EOA unit can be used as the input signal of the fourth stage EOA unit. The $(N-1)_{th}$ stage light-emitting control signal EM (N−1) can be used as the input signal of the $N_{th}$ stage EOA unit, and the Nth stage EOA unit outputs the corresponding $N_{th}$ stage light-emitting control signal EM (N).

The EOA unit of any stage needs to receive the corresponding high potential VGH and low potential VGL. The high potential VGH can turn on the corresponding thin film transistor, and the low potential VGL can turn off the corresponding thin film transistor.

The EOA units of odd stages, for example, the EOA unit of the first stage or the EOA unit of the third stage, can receive the clock signal XCK. The EOA units of even stage, such as the second stage EOA unit, can receive the clock signal CK. The clock signal XCK and clock signal CK are a pair of inverse clock signals. That is, the high potential duration of the clock signal XCK is the low potential duration of the clock signal CK, and the low potential duration of the clock signal CK is the high potential duration of the clock signal XCK.

Figure 8:
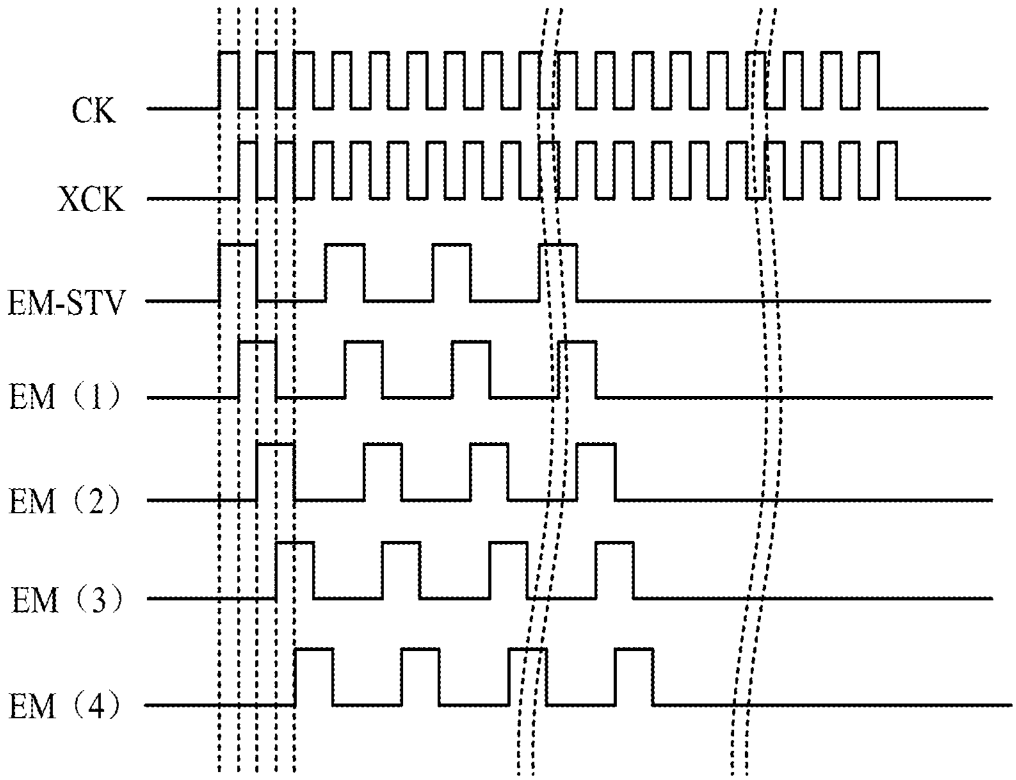
FIG. 8 is a timing diagram corresponding to the light-emitting driving circuit in FIG. 7.

As shown in FIG. 8, the first stage EOA unit further needs to receive the light-emitting initial signal EM-STV. The light-emitting control signal outputted by the EOA unit of each stage is generated under the common modulation of at least one of the light-emitting initial signal EM-STV, the clock signal CK and the clock signal XCK. For example, the first rising edge of the clock signal CK corresponds to the first rising edge of the generated light-emitting initial signal EM-STV. The first falling edge of the clock signal CK corresponds to the first rising edge of the clock signal XCK, and the first rising edge of the first stage light-emitting control signal EM (1) is generated. The second rising edge of the clock signal CK corresponds to the first falling edge of the clock signal XCK, and the first rising edge of the second stage light-emitting control signal EM (2) is generated. The second falling edge of the clock signal CK corresponds to the second rising edge of the clock signal XCK, and the first rising edge of the third stage light-emitting control signal EM (3) is generated. The third rising edge of the clock signal CK corresponds to the second falling edge of the clock signal XCK, and the first rising edge of the fourth stage light light-emitting control signal EM (4) is generated. The pulse width of the light-emitting initial signal EM-STV is the same as the pulse width of any stage light-emitting control signal. By analogy, the light-emitting driving circuit can generate any light-emitting control signal required.

Figure 9:
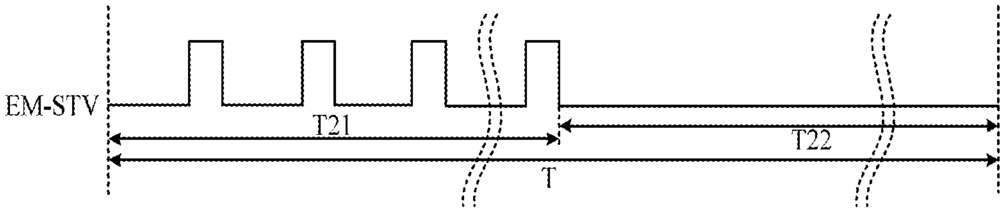
FIG. 9 is a timing diagram of an initial light-emitting signal provided by embodiments of the present disclosure.

For example, as shown in FIG. 9, in the first portion T21 of the light-emitting stage of the frame T, the light-emitting initial signal EM-STV may have multiple black frame insertion pulses. For example, for the first light-emitting control transistor T5 or the second light-emitting control transistor T6 of the p-type, the black frame insertion pulses may be the pulses shown by the high potential, so as to generate the corresponding light-emitting control signals.

Figure 10:
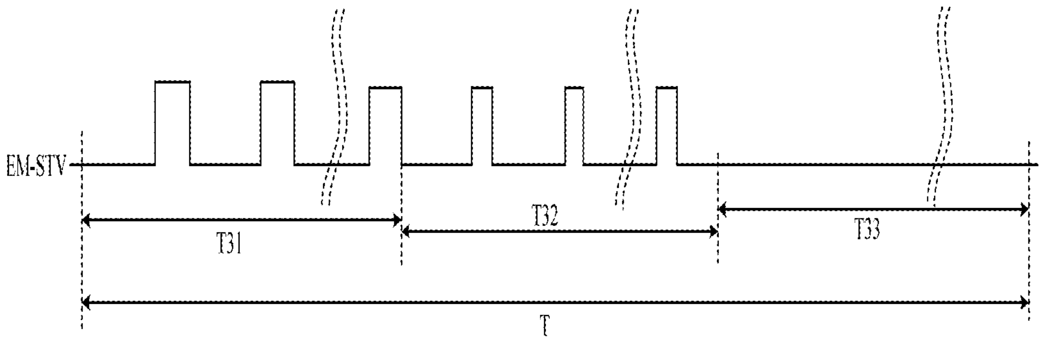
FIG. 10 is another timing diagram of an initial light-emitting signal provided by embodiments of the present disclosure.

For another example, as shown in FIG. 10, in the front ⅓ frame T31 and the intermediate ⅓ frame T32 of the light-emitting stage of the frame T, the light-emitting initial signal EM-STV may have multiple black frame insertion pulses. For example, for the first light-emitting control transistor T5 or the second light-emitting control transistor T6 of the p-type, the black frame insertion pulses may be the pulses shown by the high potential, and it may be allowed for the b black frame insertion pulses to be not performed in the last ⅓ frame T33. In the same way, the corresponding light-emitting control signals are generated thereby.

In one of the embodiments, the present embodiment provides a method for controlling the display panel in any one of the aforementioned embodiments, which includes: controlling the light-emitting driving circuit to provide the light-emitting control signal to the pixel circuit during the light-emitting stage of the frame of the pixel circuit.

It can be understood that for one of ordinary skill in the art, equivalent replacements or changes can be made according to the technical solutions and the invention concept of the present disclosure, and all these changes or replacements shall fall within the scope of the following claims of the present disclosure.

What is claimed is:

1. A pixel circuit, comprising:

a light-emitting device;

a driving module electrically connected to the light-emitting device for driving the light-emitting device to emit light; and a light-emitting control module connected to the driving module, wherein the light-emitting control module, the light-emitting device and the driving module are connected in series between a first voltage terminal and a second voltage terminal, a control terminal of the light-emitting control module is configured for receiving a light-emitting control signal, and the light-emitting control signal comprises black frame insertion pulses and light-emitting pulses, wherein the black frame insertion pulses are configured for cutting off an illumination loop of the pixel circuit, and the light-emitting pulses are configured for conducting the illumination loop;

wherein a light-emitting stage of a frame of the pixel circuit at least comprises an early light-emitting stage of said frame and a late light-emitting stage of said frame, a duty ratio of the black frame insertion pulses to the early light-emitting stage of said frame is a first ratio value, a duty ratio of the black frame insertion pulses to the late light-emitting stage of said frame is a second ratio value, and the first ratio value is greater than the second ratio value.

2. The pixel circuit according to claim 1, wherein in the early light-emitting stage of said frame, the black frame insertion pulses and the light-emitting pulses are alternate.

3. The pixel circuit according to claim 1, wherein in the early light-emitting stage of said frame and/or the late light-emitting stage of said frame, at least one of widths of the black frame insertion pulses and a number of the black inserting pulses is different.

4. The pixel circuit according to claim 3, wherein a number of the black frame insertion pulses within a unit time of at least portion of a time period in the early light-emitting stage of said frame is greater than a number of the black frame insertion pulses within a unit time of at least portion of a time period in the late light-emitting stage of said frame; and/or widths of at least portion of the black frame insertion pulses in the early light-emitting stage of said frame are greater than widths of at least portion of the black frame insertion pulses in the late light-emitting stage of said frame.

5. The pixel circuit according to claim 3, wherein the duty ratio of the black frame insertion pulses within at least portion of a time period decreases in the order from a beginning to an end of the early light-emitting stage of said frame.

6. The pixel circuit according to claim 5, wherein from the beginning to the end of the early light-emitting stage of said frame, a number of the black frame insertion pulses within the at least portion of the time period decreases, and/or widths of the black frame insertion pulses within the at least portion of the time period decrease.

7. The pixel circuit according to claim 1, wherein a duty ratio of the early light-emitting stage of said frame to the light-emitting stage of said frame is greater than or equal to 25% and less than or equal to 75%.

8. The pixel circuit according to claim 1, wherein the light-emitting stage of said frame further comprises an intermediate light-emitting stage of said frame between the early light-emitting stage of said frame and the late light-emitting stage of said frame, wherein a duty ratio of the black frame insertion pulses to the intermediate light-emitting stage of said frame is a third ratio value, the third ratio value is greater than or equal to the second ratio value, and the third ratio value is less than the first ratio value.

9. The pixel circuit according to claim 1, wherein the driving module comprises a driving transistor, and the light-emitting control module comprises a first light-emitting control transistor and a second light-emitting control transistor, one of a source and a drain of the first light-emitting control transistor is connected to the first voltage terminal, the other of the source and the drain of the first light-emitting control transistor is connected to one of a source and a drain of the driving transistor, the other of the source and the drain of the driving transistor is connected to one of a source and a drain of the second light-emitting control transistor, the other of the source and the drain of the second light-emitting control transistor is connected to an anode of the light-emitting device, a cathode of the light-emitting device is connected to the second voltage terminal, and a gate of the first light-emitting control transistor and a gate of the second light-emitting control transistor both are configured for receiving the light-emitting control signal.

10. The pixel circuit according to claim 9, wherein the pixel circuit further comprises a transmission transistor, a first reset transistor, a second reset transistor, and a storage capacitor, one of a source and a drain of the transmission transistor is connected to the other of the source and the drain of the driving transistor, the other of the source and the drain of the transmission transistor is connected to a gate of the driving transistor, one terminal of the storage capacitor and one of a source and a drain of the first reset transistor, the other terminal of the storage capacitor is connected to the first voltage terminal, the other of the source and the drain of the first reset transistor is connected to one of a source and a drain of the second reset transistor and is configured for receiving a reset signal, and the other of the source and the drain of the second reset transistor is connected to the anode of the light-emitting device; and wherein each of the transmission transistor and the first reset transistor is a low-temperature polysilicon thin film transistor.

11. A display panel, comprising:

a light-emitting driving circuit; and a pixel circuit connected to the light-emitting driving circuit that provides the light-emitting control signal, wherein the pixel circuit comprises:

a light-emitting device;

a driving module electrically connected to the light-emitting device for driving the light-emitting device to emit light; and a light-emitting control module connected to the driving module, wherein the light-emitting control module, the light-emitting device and the driving module are connected in series between a first voltage terminal and a second voltage terminal, a control terminal of the light-emitting control module is configured for receiving a light-emitting control signal, and the light-emitting control signal comprises black frame insertion pulses and light-emitting pulses, wherein the black frame insertion pulses are configured for cutting off an illumination loop of the pixel circuit, and the light-emitting pulses are configured for conducting the illumination loop;

wherein a light-emitting stage of a frame of the pixel circuit at least comprises an early light-emitting stage of said frame and a late light-emitting stage of said frame, a duty ratio of the black frame insertion pulses to the early light-emitting stage of said frame is a first ratio value, a duty ratio of the black frame insertion pulses to the late light-emitting stage of said frame is a second ratio value, and the first ratio value is greater than the second ratio value.

12. The display panel according to claim 11, wherein the light-emitting driving circuit comprises multiple emitting on array EOA units in cascade, each of the multiple EOA units is configured to output a corresponding light-emitting control signal, and a first stage EOA unit of the multiple EOA units is configured to receive a light-emitting initial signal, and the light-emitting initial signal comprises the black frame insertion pulses.

13. The display panel according to claim 11, wherein in the early light-emitting stage of said frame, the black frame insertion pulses and the light-emitting pulses are alternate.

14. The display panel according to claim 11, wherein in the early light-emitting stage of said frame and/or the late light-emitting stage of said frame, at least one of widths of the black frame insertion pulses and a number of the black inserting pulses is different.

15. The display panel according to claim 14, wherein a number of the black frame insertion pulses within a unit time of at least portion of a time period in the early light-emitting stage of said frame is greater than a number of the black frame insertion pulses within a unit time of at least portion of a time period in the late light-emitting stage of said frame; and/or widths of at least portion of the black frame insertion pulses in the early light-emitting stage of said frame are greater than widths of at least portion of the black frame insertion pulses in the late light-emitting stage of said frame.

16. The display panel according to claim 14, wherein the duty ratio of the black frame insertion pulses within at least portion of a time period decreases in the order from a beginning to an end of the early light-emitting stage of said frame.

17. The display panel according to claim 16, wherein from the beginning to the end of the early light-emitting stage of said frame, a number of the black frame insertion pulses within the at least portion of the time period decreases, and/or widths of the black frame insertion pulses within the at least portion of the time period decrease.

18. The display panel according to claim 11, wherein a duty ratio of the early light-emitting stage of said frame to the light-emitting stage of said frame is greater than or equal to 25% and less than or equal to 75%.

19. The display panel according to claim 11, wherein the light-emitting stage of said frame further comprises an intermediate light-emitting stage of said frame between the early light-emitting stage of said frame and the late light-emitting stage of said frame, wherein a duty ratio of the black frame insertion pulses to the intermediate light-emitting stage of said frame is a third ratio value, the third ratio value is greater than or equal to the second ratio value, and the third ratio value is less than the first ratio value.

20. A method for controlling a display panel, wherein the display panel comprises:

a light-emitting driving circuit; and a pixel circuit connected to the light-emitting driving circuit that provides the light-emitting control signal, wherein the pixel circuit comprises:

a light-emitting device;

a driving module electrically connected to the light-emitting device for driving the light-emitting device to emit light; and a light-emitting control module connected to the driving module, wherein the light-emitting control module, the light-emitting device and the driving module are connected in series between a first voltage terminal and a second voltage terminal, a control terminal of the light-emitting control module is configured for receiving a light-emitting control signal, and the light-emitting control signal comprises black frame insertion pulses and light-emitting pulses, wherein the black frame insertion pulses are configured for cutting off an illumination loop of the pixel circuit, and the light-emitting pulses are configured for conducting the illumination loop;

wherein a light-emitting stage of a frame of the pixel circuit at least comprises an early light-emitting stage of said frame and a late light-emitting stage of said frame, a duty ratio of the black frame insertion pulses to the early light-emitting stage of said frame is a first ratio value, a duty ratio of the black frame insertion pulses to the late light-emitting stage of said frame is a second ratio value, and the first ratio value is greater than the second ratio value, and wherein the method for controlling a display panel comprises:

controlling the light-emitting driving circuit to provide the light-emitting control signal to the pixel circuit during the light-emitting stage of said frame of the pixel circuit.

* * * * *